June 12, 1934.　　　G. G. MORENO　　　1,962,321
VIEWING AND FOCUS FINDING DEVICE FOR CAMERAS
Filed April 18, 1931　　　2 Sheets-Sheet 1
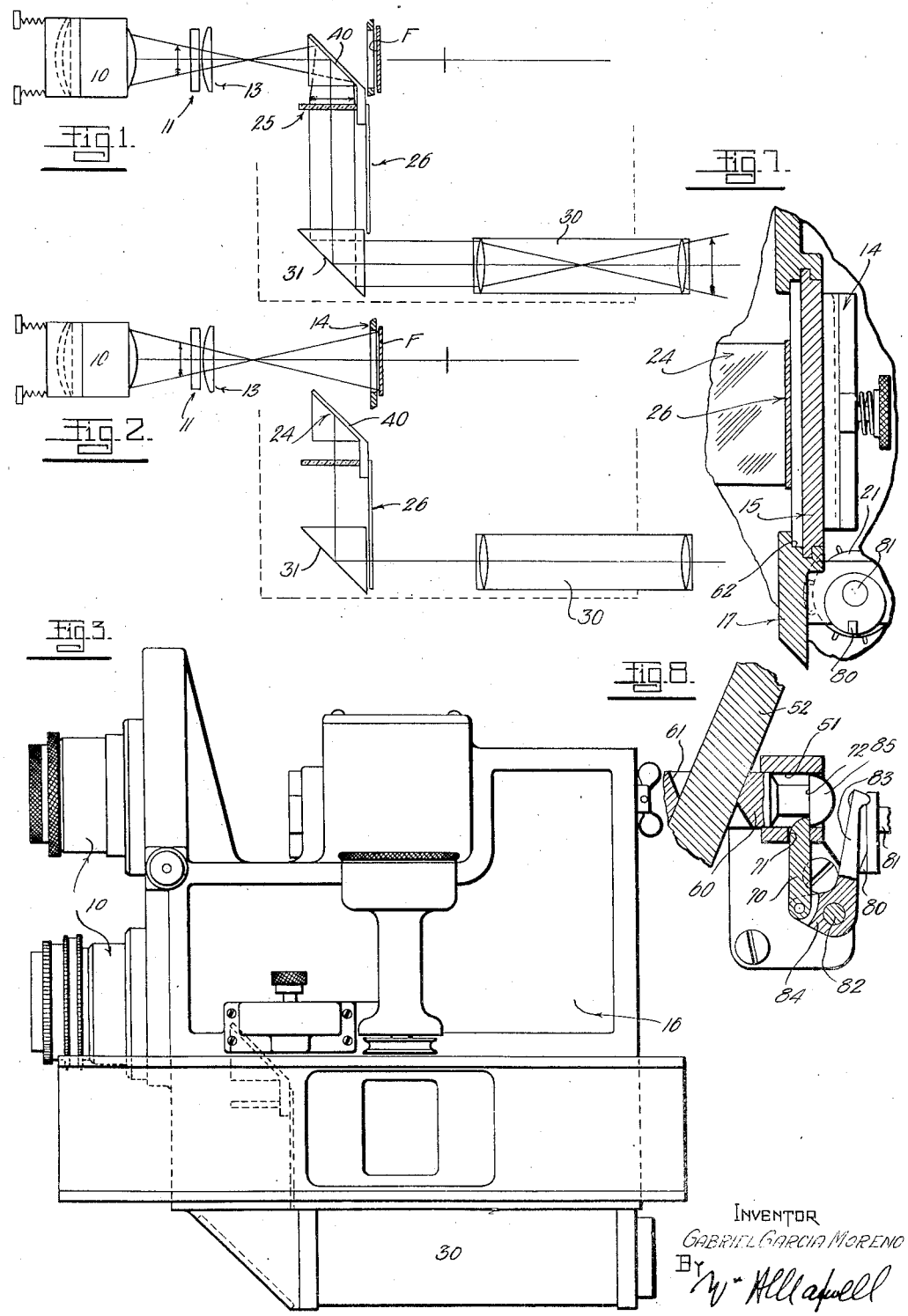
INVENTOR
GABRIEL GARCIA MORENO
BY
His Attorney June 12, 1934.    G. G. MORENO    1,962,321
VIEWING AND FOCUS FINDING DEVICE FOR CAMERAS
Filed April 18, 1931    2 Sheets-Sheet 2
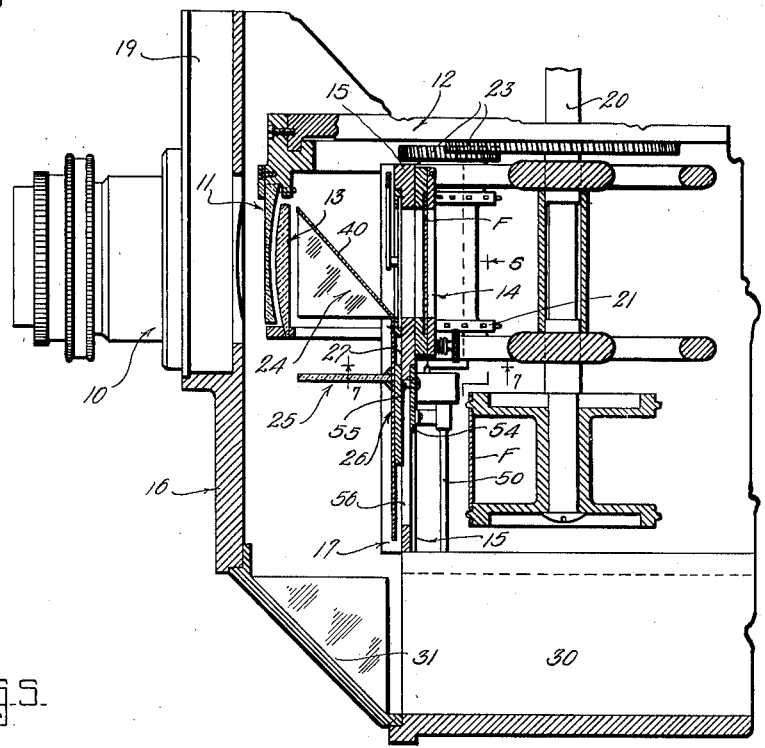
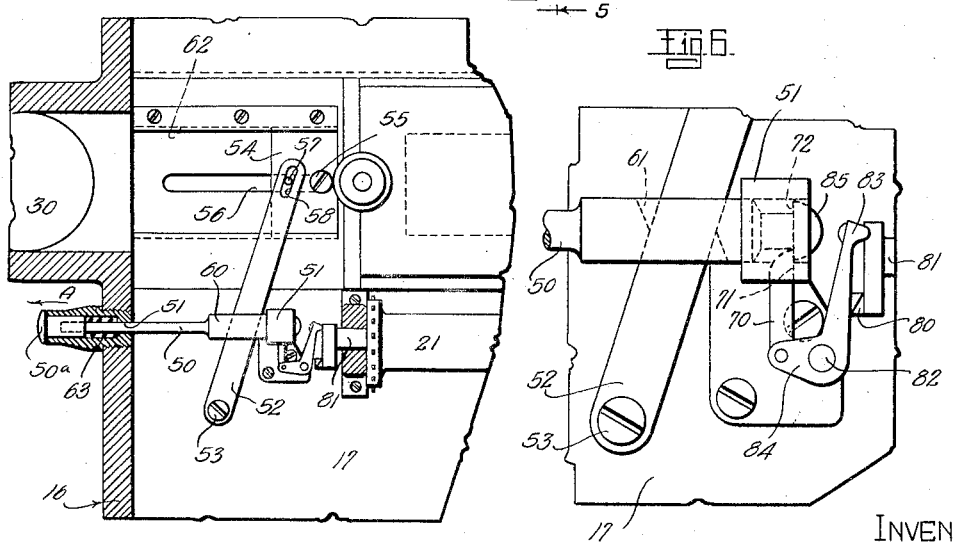
INVENTOR
GABRIEL GARCIA MORENO
BY W. H. Maxwell
HIS ATTORNEY Patented June 12, 1934

1,962,321

UNITED STATES PATENT OFFICE 1,962,321

VIEWING AND FOCUS-FINDING DEVICE FOR CAMERAS

Gabriel Garcia Moreno, Los Angeles, Calif., assignor to Moreno-Snyder Cine Corporation, Ltd., Los Angeles, Calif., a corporation of Delaware Application April 18, 1931, Serial No. 531,201

2 Claims. (Cl. 88—16)

This invention relates to a viewing and focus-finding device for cameras, and it is a general object of the invention to provide improvements in the construction, application, and control of a device for use in a camera to view the image projected by the lens onto the film and to observe the focus of the lens.

It is a primary object of the present invention to provide a device of the character mentioned which enables an operator to view an image through the optical system of the camera, without disturbing the film, which image is identical with that which would fall upon the film.

Another object of this invention is to provide a device of the character mentioned by which the focusing and locating of the subject may be done through the same lens used in photographing, without moving the lens or the film.

Another object of the present invention is to provide a device of the character mentioned having an element movable into and out of position in the path of light passing from the lens to the film, where it reflects off the light, enabling the operator to obtain an image identical with that which would fall upon the film.

It is a further object of the present invention to provide a device of the character mentioned having a movable reflector and an image-receiving screen mounted to be normally outside of the optical system of the camera, but shiftable into position between the optical system and the film so that an image is formed on the screen the same as that which would fall upon the film.

Another object of the present invention is to provide an optical system of the character mentioned which includes a viewing device located so that the operator views the image obtained in the focusing device by looking in the direction of the subject.

A further object of the present invention is to provide a viewing device including an element which prevents light from entering the camera through the device to interfere with the film.

A further object of the present invention is to provide a simple, dependable, and convenient control for the device of the invention.

It is a further object of the present invention to provide an inter-connection between the viewing and focus finding device and the mechanism of the camera, assuring positioning of the device so that it does not interfere with the optical system of the camera when the mechanism of the camera is in operation.

A further object of the present invention is to provide unique features in the connection between the viewing and focus finding device and the mechanism of the camera, making the construction simple and convenient to operate and, at the same time, practical and economical.

The various objects and features of my invention will be best and more fully understood from the following detailed description of a typical form and application of the invention, throughout which description reference will be had to the accompanying drawings, in which:

Fig. 1 is a diagrammatic view illustrating the optical system and viewing device of a camera showing the device in position to intercept light passing from the lens assembly of the optical system toward the film. Fig. 2 is a diagrammatic view similar to Fig. 1, showing the device in its normal or unactuated position where it in no way interferes with the passage of light from the lenses of the optical system to the film. Fig. 3 is a plan view of a camera embodying the device of the present invention, being a view showing the general application of the device to the camera. Fig. 4 is a horizontal detailed plan section of the camera shown in Fig. 3, being a view taken through the view and focus finding device showing the structural relationship of the device to the film gate and lens elements of the camera. Fig. 5 is a detailed sectional view of parts shown in Fig. 4, being a view taken as indicated by line 5—5 on Fig. 4. Fig. 6 is an enlarged view of certain of the parts shown in Fig. 5. Fig. 7 is an enlarged detailed sectional view taken as indicated by line 7—7 on Fig. 4, and Fig. 8 is a sectional view of certain of the parts shown in Fig. 6.

The view and focus finding device provided by this invention is applicable, generally, to cameras, and is particularly useful as applied to motion picture cameras. The invention may be applied to the ordinary or conventional type of motion picture camera, in which case it is embodied in the camera structure so that its shiftable element is operable into and out of position between the lens and the film. The invention is also applicable to cameras involving special or more complicated optical systems, for instance, as illustrated in the drawings, it may be applied to a camera involving an optical system facilitating the taking of pictures on a continuously moving film. The particular camera and optical system illustrated in the drawings is the subject of my Patent No. 1,943,689, issued January 16, 1934. It is to be understood that the invention is not to be construed as limited to any particular form or type of camera, but is general in its application and, further, that various modifications and variations may occur in the invention and its method of application to a camera, depending upon peculiarities or special features of the particular camera to which it is applied.

The camera illustrated in the drawings has an optical system or photographic lens assembly which includes, generally, an objective lens 10, moving lens elements 11 carried in an annular series by a rotor or lens carrier 12 which operates to move the lens elements through the axis of the objective lens at a point behind the objective lens, and a corrective lens 13 located behind the point at which the lens elements 11 are moved through the axis of the optical system to correct enlargement and distortion created by the lens elements 11. The film F is carried in a gate 14 located behind the lenses of the optical system. The gate 14 is carried by a base plate 15 mounted in the case or body 16 of the camera. In the particular construction illustrated, the base plate 15 is carried by a removable partition 17 within the body 16 of the camera. The objective lens 10 is mounted at the front of the camera body 16 on a lens turret 19, similar, generally, to the turret ordinarily employed in mounting objective lenses of a motion picture camera.

The lens carrier 12 is mounted in the camera body 16 on a shaft 20. The lens elements 11 are carried at the periphery of the carrier 12 in an annular series so that, as the carrier revolves, the lens elements move across the optical system successively. The lens elements 11 are such as to deflect the light passing from the objective lens 10 to the film, causing the images falling on the film to move in synchronism with the film F. The film F is moved continuously by a film-advancing sprocket 21 which operates in synchronism with the lens carrier through connecting gears 23. The parts to which I have referred are more fully set forth in the above-mentioned patent.

The viewing and focus finding device provided by this invention includes, generally, a reflector 24 shiftable into and out of the shaft of light directed by the lenses of the optical system toward the film F, an image-receiving element 25 related to the reflector 24 to receive the light from the optical system when it is reflected by the reflector 24, a carriage 26 supporting the reflector and the element 25, and a control for the carriage.

The reflector 24 illustrated throughout the drawings is a prismatic reflector, having a reflecting face which is angularly related to the longitudinal axis of the optical system to reflect off a shaft of light at right angles to the axis of the optical system when the reflector is in operating position, as shown in Figs. 1 and 4 of the drawings. When the reflector is in the normal or unactuated position, it is entirely clear of the optical system and the film F, as is illustrated in Fig. 2 of the drawings.

The carriage 26 which supports the reflector 24 may be slidably mounted to carry the reflector into and out of the position illustrated in Figs. 1 and 4. In the particular construction illustrated, the carriage 26 is slidably mounted in a guideway 27 in the base plate 15 which carries the film gate 14. The guideway 27 is horizontally disposed so that the reflector is shiftable horizontally in a direction at right angles to the axis of the optical system between the positions illustrated in Figs. 1 and 2 of the drawings.

The image-receiving element 25 is in the nature of a screen or ground glass located to receive the reflected light when the reflector 24 is in operating position as illustrated in Figs. 1 and 4. When the parts are in this position, the image-receiving element or screen, as I will hereinafter term it, is spaced from the reflector so that it bears the same optical relation to the lenses of the optical system as does the film F when the reflector is unactuated, as shown in Fig. 2. In the preferred form of the invention, the screen 25 is supported by the carriage 26 so that it is movable with the reflector 24. With this construction, the screen may be set on the carriage in the desired position with reference to the reflector 24.

To facilitate viewing the image cast upon the screen 25 by the reflector 24, a viewing device 30 is located at one side of the camera body 16. The viewing device 30 has a sight opening at the rear of the camera through which the operator looks in the direction of the object to be photographed in order to view the image obtained on the screen 25. A reflector 31 is located in front of the viewing device and in line with the screen, so that a person looking through the viewing device sees an image of the screen in the reflector 31. The viewing device 30 is preferably a telescopic device which operates to enlarge the image of the screen and position it so that the observer sees the image of the subject to be photographed in its correct position. The reflector 31 and the viewing device 30 are preferably stationary with the other parts of the viewing and focus finding device, except, of course, that the device 30 may involve means for adjustment in order to properly focus the image of the screen.

A shield 40 of opaque material is arranged behind the reflector 24 to positively stop the passage of light through the reflector either from the optical system to the film, when the reflector is positioned as in Fig. 1, or from the viewing device to the film. In practice, the shield 40 may be an opaque coating on the back of the reflector surface 24, or it may be in the nature of a metal part which also acts as a holder for mounting or supporting the reflector prism on the carriage. It is to be noted that the reflector 24 moves toward the reflector 31 upon being moved out of the optical system, with the result that the shield 40 is always in position to intercept light entering the device 30, preventing exposure of the film.

The control for the carriage 26 includes, generally, a manually operable member 50 operatively connected with the carriage to facilitate shifting of the carriage manually. The member 50 is shown in the form of a push rod mounted in bearings 51 so that it has one end within the camera body and the other end at the exterior of the body. An operating head 50ª is provided on the outer end of the push rod. In the form of the invention illustrated, the push rod 50 is operatively connected with the carriage 26 through a lever 52 having one end pivotally supported by a pivot pin 53 and the other end slidably pivotally connected with the carriage 26. The last-mentioned connection includes a plate 54 on the back of the base plate 15, a member 55 extending through a slot 56 in the base plate connecting the plate 54 with the carriage 26 at the front of the base plate, and a pin 57 projecting from the plate 54 to slidably operate in a slot 58 in the lever.

The push rod 50 engages the lever 52 intermediate its ends. In the construction illustrated, the push rod is shown provided with an enlarged part 60 having an opening 61 passing the lever 52. As the push rod 50 is reciprocated, the lever 52 is swung about the pivot pin 53, causing the plate 54 and the carriage 26, connected with the plate through the member 55, to shift horizontally along the base plate. The plate 54 is preferably carried in a suitable guide at the rear of the base plate, which guide is parallel with the guideway 27 and the slot 56.

A spring 63 is provided in connection with the parts just described so that it acts to normally yieldingly hold the parts in position where the reflector 24 is inoperative, as shown in Fig. 2. In the arrangement illustrated, the spring 63 is shown in the form of a compression spring acting between one end of one of the bearings 51 and the head 50ª to normally urge the rod 50 outwardly or in the direction indicated by the arrow A in Fig. 5.

For the purpose of holding the reflector 24 in the operative position shown in Figs. 1 and 4 without manually holding the head 50ª depressed, a latch 70 is slidably carried in an opening 71 in one of the bearings 51 to co-operate with a shoulder 72 on the part 60 of the rod to hold the rod in the "in" or operated position, as shown in Figs. 6 and 8 of the drawings.

When the rod 50 is moved to the operated position shown in Figs. 6 and 8, the latch 70 moves into position behind the shoulder 72 and thus operates to hold the rod against movement under the action of the spring 63.

In accordance with the present invention, the latch 70 is adapted to be released through the mechanism of the camera. The connection between the mechanism of the camera and the latch is such that the latch is released upon the camera being put into operation. In the form of the invention illustrated, a cam 80 is provided on the shaft 81 that carries and drives the film-operating sprocket 21. A bell crank is mounted on a shaft 82 so that it has an arm 83 in position to be operated by the cam and an arm 84 connected with the latch 70. The cam 80 is designed to co-operate with the outer end of the arm 83 so that the bell crank is rocked through engagement of the cam with the arm, causing the latch to be withdrawn from the shoulder 72. Upon operation of the bell crank by the cam, the latch releases the push rod so that the shiftable carriage 26 of the device is moved to the normal unactuated position by the action of the spring 63. The latch 70 is held in the down or depressed position by the part 85 of the push rod so that the arm 83 of the bell crank remains in position where it is clear of the cam 80. When the push rod is moved inwardly or is operated to move the carriage of the device to operating position, the part 85 of the push rod engages the outer end portion of the arm 84 of the bell crank, causing the latch 70 to be moved up to the position where it co-operates with the shoulder 72. In the course of this operation, the carriage may over-travel, its position being determined by the co-operation of the shoulder 72 and latch 70.

With the mechanism just described, operation of the camera in either direction causes releasing of the latch 70 if the carriage of the device is in operating position, so that the device is returned to the normal unactuated position, leaving the optical system of the camera unobstructed so that the film F is exposed.

From the foregoing description of one form and application of the invention, it will be apparent that the invention has provided a device that is extremely simple and convenient to operate and that the device enables an operator to view the image that is to be photographed on the film F exactly as the image falls on the film. It is a significant feature of the invention that the objective lens and film are in no way disturbed by operation of the viewing and focus finding device, as is the case with various similar devices commonly used on cameras. It is also an important feature of the invention that the operator views the image obtained by the device by looking in the direction of the object to be photographed. The control for the shiftable part of the device is not only simple and convenient to operate, but is of great practical importance in that it positively prevents operation of the camera with the reflector of the device in position where it would prevent light from the optical system falling on the film F. As soon as the mechanism of the camera is put in motion in either direction, the latch holding the carriage of the device in operating position is released, allowing the carriage to be moved to the normal unactuated position.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A camera including a photographic lens, a film support, means for operating film, a viewing and focus finding device including a shiftable reflector operable into and out of position where it intercepts light passing from the lens to the film, and a screen shiftable together with the reflector for receiving light from the reflector, a lever operatively connected with the reflector for shifting it, a rod for operating the lever, the rod being manually operable in one direction, a spring normally tending to operate the rod in the other direction, a latch for holding the rod against being operated by the spring, and means operated directly by the film operating means for releasing the latch.

2. A camera including a photographic lens, a film support, means for operating film, and a viewing and focus-finding device including a reflecting element shiftable between an operative position where it intercepts light passing from the lens to the film, and an inoperative position clear of the path of said light, means normally operatable to move said element from the operative position to the inoperative position, a manually operatable control latch for releasably holding said element in the operative position, and means operated by the first named means for releasing the control latch upon operation of the film.

GABRIEL GALCIA MORENO.